(12) United States Patent
Hoshino et al.

(10) Patent No.: US 8,081,702 B2
(45) Date of Patent: Dec. 20, 2011

(54) RADIO COMMUNICATION SYSTEM, RADIO COMMUNICATION DEVICE, AND CHANNEL CORRELATION MATRIX DECISION METHOD

(75) Inventors: Masayuki Hoshino, Kanagawa (JP); Kenichi Miyoshi, Kanagawa (JP); Yasuaki Yuda, Kanagawa (JP); Katsuhiko Hiramatsu, Kanagawa (JP); Ryohei Kimura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 565 days.

(21) Appl. No.: 12/280,677

(22) PCT Filed: Feb. 28, 2007

(86) PCT No.: PCT/JP2007/053753
§ 371 (c)(1),
(2), (4) Date: Mar. 2, 2009

(87) PCT Pub. No.: WO2007/099998
PCT Pub. Date: Sep. 7, 2007

(65) Prior Publication Data
US 2009/0185634 A1    Jul. 23, 2009

(30) Foreign Application Priority Data

Feb. 28, 2006  (JP) ................................. 2006-053901
Feb. 26, 2007  (JP) ................................. 2007-045423

(51) Int. Cl.
*H04B 7/02* (2006.01)
(52) U.S. Cl. ...................................................... 375/267
(58) Field of Classification Search .................. 375/260, 375/267
See application file for complete search history.

(56) References Cited

U.S. PATENT DOCUMENTS

| | | | |
|---|---|---|---|
| 2003/0043929 A1* | 3/2003 | Sampath | 375/267 |
| 2004/0042427 A1* | 3/2004 | Hottinen | 370/335 |
| 2004/0185909 A1* | 9/2004 | Alexiou et al. | 455/562.1 |
| 2007/0109954 A1* | 5/2007 | Pasanen et al. | 370/204 |

FOREIGN PATENT DOCUMENTS

| | | |
|---|---|---|
| WO | 03/001761 | 1/2003 |
| WO | 2004/038985 | 5/2004 |
| WO | 2004/039022 | 5/2004 |

OTHER PUBLICATIONS

International Search Report dated Apr. 3, 2007.

* cited by examiner

*Primary Examiner* — Don N Vo
(74) *Attorney, Agent, or Firm* — Dickinson Wright PLLC

(57) ABSTRACT

It is possible to prevent lowering of a throughput of a radio communication system even when propagation path environments of an uplink line and downlink line are asymmetric. A maximum proper value calculation unit (115) calculates a maximum proper value from a channel matrix. A maximum proper value comparison unit (116) compares the maximum proper value with a maximum proper value of the downlink line reported separately from a base station. According to the comparison result obtained by the maximum proper value comparison unit (116), a proper mode initiative instruction unit (117) decides to pass the proper mode initiative to a communication partner or to the local device. When the initiative is to be passed to the local device, this fact is reported to a proper bam correction unit (118). When the proper beam correction unit (118) gets the proper mode initiative, the proper beam correction unit (118) corrects the correlation matrix by using the proper values of both of the downlink line and the uplink line and instructs a directivity forming unit (103) to form a proper beam according to the correlation matrix after the correction.

14 Claims, 9 Drawing Sheets

RADIO COMMUNICATION SYSTEM, RADIO COMMUNICATION DEVICE, AND CHANNEL CORRELATION MATRIX DECISION METHOD

TECHNICAL FIELD

The present invention relates to a radio communication system employing the MIMO (Multiple-Input Multiple-Output) scheme, a radio communication apparatus used in this system and a channel correlation matrix determination method.

BACKGROUND ART

In recent years, in mobile communication systems such as mobile telephone devices, with diversity of service aspects, transmitting large volume data such as still images and moving images in addition to speech is demanded. Further, studies are underway on the MIMO communication system as a data transmission method of large volume data in the next-generation mobile communication system. The MIMO system provides a plurality of antennas on the transmitting side and the receiving side to transmit and receive a plurality of independent streams at the same time in the same band, so that it is possible to increase the throughput of the communication system without expanding the frequency band. In particular, with eigenmode transmission using array antennas, in the same frequency band, it is possible to transmit and receive independent signals formed with a plurality of eigenvectors at the same time.

Further, in the TDD (Time Division Duplex) system for cellular devices, adopting eigenmode transmission is studied (e.g., see Patent Document 1). FIG. 1 illustrates an image of communication using an eigenmode transmission scheme. Here, assume that radio transmitting apparatus 10 has M array antennas and radio receiving apparatus 20 has N array antennas (M and N are natural numbers equal to or greater than 2). Radio transmitting apparatus 10 forms eigenbeams B1 and B2 for transmission signals and performs transmission processing, and radio receiving apparatus 20 forms eigenbeams B3 and B4 for received signals and performs receiving processing.

In this case, response matrix A of the MIMO channel is expressed by following equations 1 to 5 using eigenvalue $\lambda_i$ of eigenvector #i (i=1, 2, 3, ..., $M_0$).

[1]

$$A = E_r D E_t^H = \sum_{i=1}^{M_0} \sqrt{\lambda_i} e_{r,i} e_{t,i}^H \quad \text{(Equation 1)}$$

$$M_0 = \min(M, N) \quad \text{(Equation 2)}$$

$$D = diag[\sqrt{\lambda_1}, \sqrt{\lambda_2}, \ldots, \sqrt{\lambda_{M_0}}] \quad \text{(Equation 3)}$$

$$E_t = [e_{t,1}, e_{t,2}, \ldots, e_{t,M_0}] \quad \text{(Equation 4)}$$

$$E_r = [e_{r,1}, e_{r,2}, \ldots, e_{r,M_0}] \quad \text{(Equation 5)}$$

Here, in equations 1 to 5, $e_{t,i}$ is the eigenvector of radio transmitting apparatus 10 associated with eigenvalue $\lambda_i$ of channel correlation matrix $A^H A$, and $e_{r,i}$ is the eigenvector of radio receiving apparatus 20 associated with eigenvalue $\lambda_i$ of channel correlation matrix $AA^H$.

By using this eigenmode transmission scheme, it is possible to increase the transmission capacity of the communication system without expanding the frequency band.

Non-Patent Document 1: "2.1. Uplink Sounding," 3GPP TSG RAN WG1 #42, R1-051516, November 2005.

DISCLOSURE OF INVENTION

Problems to be Solved by the Invention

The TDD scheme refers to a scheme of performing communication using the same frequency between transmission and reception and switching them in time division. The switching rate between transmission and reception is generally designed to be sufficiently faster than the fading fluctuation rate. Therefore, for example, assuming the radio communication system shown in FIG. 2, ideally, fading fluctuation ($h_{DL}$) that occurs when signal S1 is transmitted from a base station (Node B) to a communication terminal (UE), is the same as fading fluctuation ($h_{UL}$) that occurs when signal S2 is transmitted from the communication terminal. That is, it is possible to process the channel correlation matrix of a signal received by either radio communication apparatus as the channel correlation matrix of the opposite link and form eigenbeams. This characteristic is referred to as the reversibility (symmetry) of the TDD scheme.

However, in the actual cellular system, a base station and a communication terminal are subjected to a different interference influence. Consequently, if eigenmode transmission is performed utilizing the reversibility of channels, there is a problem that optimal eigenbeams are different between uplink and downlink. FIG. 3 illustrates this problem in detail. In this figure, $H_{UL}$ and $H_{DL}$ represent an uplink MIMO channel response matrix (A) and a downlink MIMO channel response matrix (A), respectively.

For example, as shown in FIG. 3, communication terminal 50 located at a cell edge receives transmission signals S14 and S15 from an adjacent cell in addition to signal S13 directed to communication terminal 50, and, consequently, is interfered by these signals (i.e., intercell interference). On the other hand, although base station 60 located at the center of the cell is not likely to be interfered by such other cells, base station 60 receives signals S11 and S12 from a plurality of communication terminals, thereby causing interference between these received signals (i.e., inter-user interference). Therefore, the channel correlation matrixes, which are ideally the same between uplink and downlink, actually have different interference elements and therefore are asymmetrical. As a result, the optimal eigenbeam is different between the channel correlation matrixes, thereby decreasing the throughput of the radio communication system.

It is therefore an object of the present invention to provide, where uplink and downlink propagation environments are asymmetrical, that is, where uplink and downlink propagation environments are different, a radio communication system or the like that prevents throughput deterioration in the radio communication system.

Problems to be Solved by the Invention

The radio communication system of the present invention employs a configuration having: a first acquiring section that, out of a first channel correlation matrix and a second channel correlation matrix showing properties of two-way channel between two radio communication apparatuses, acquires a first characteristic value showing a characteristic of the first channel correlation matrix; a second acquiring section that acquires a second characteristic value showing a characteristic of the second channel correlation matrix; a determining section that, based on the first characteristic value and the second characteristic value, determines a reference channel correlation matrix to be used to correct the first channel correlation matrix and the second channel correlation matrix; and a correcting section that corrects one or of both the first channel correlation matrix and the second channel correlation matrix based on the reference channel correlation matrix.

Advantageous Effect of the Invention

According to the present invention, it is possible to improve the throughput of the radio communication system even when uplink and downlink propagation environments are asymmetrical.

BEST MODE FOR CARRYING OUT THE INVENTION

Embodiments of the present invention will be explained below in detail with reference to the accompanying drawings.

Embodiment 1

Figure 1:
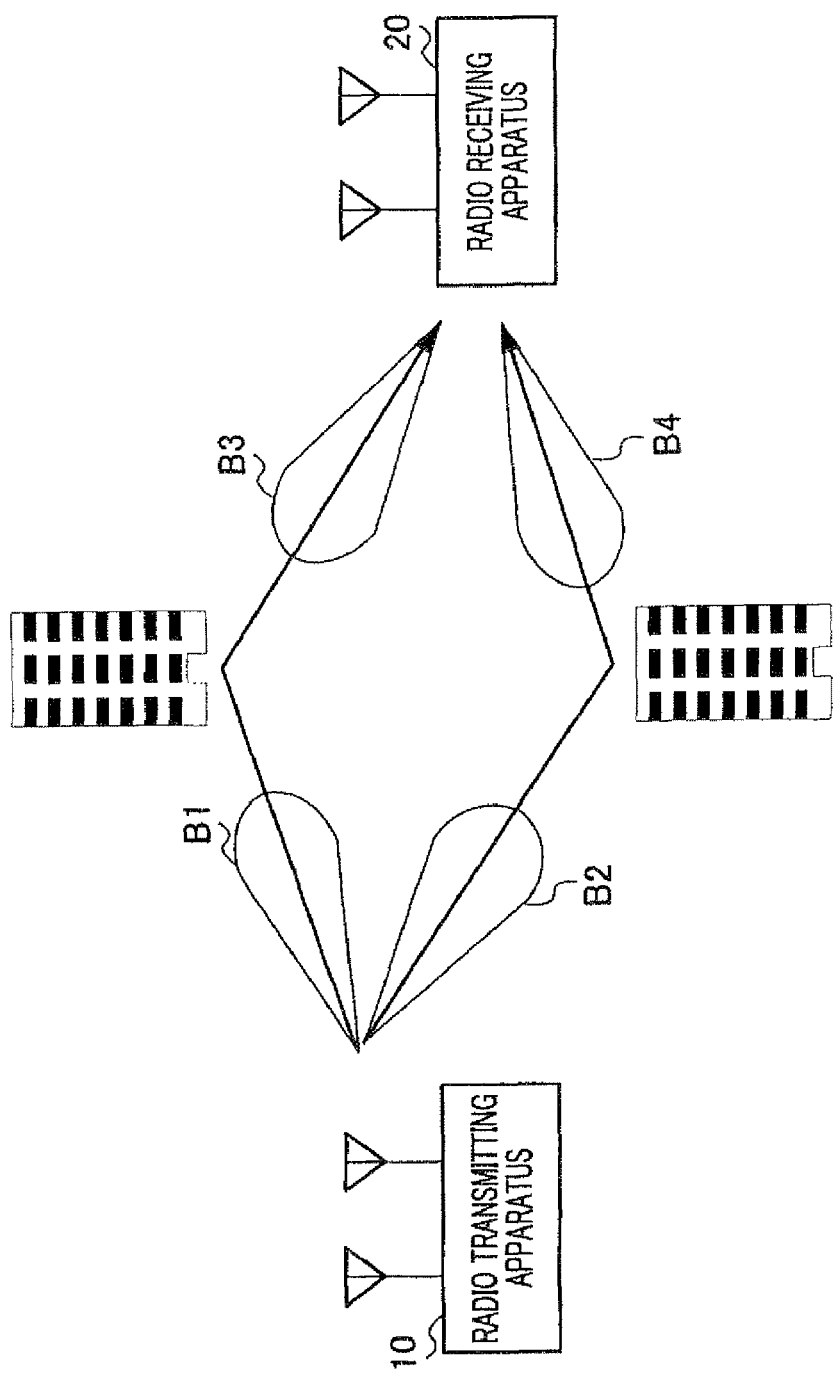
FIG. 1 illustrates an image of communication using an eigenmode transmission scheme.
Figure 2:
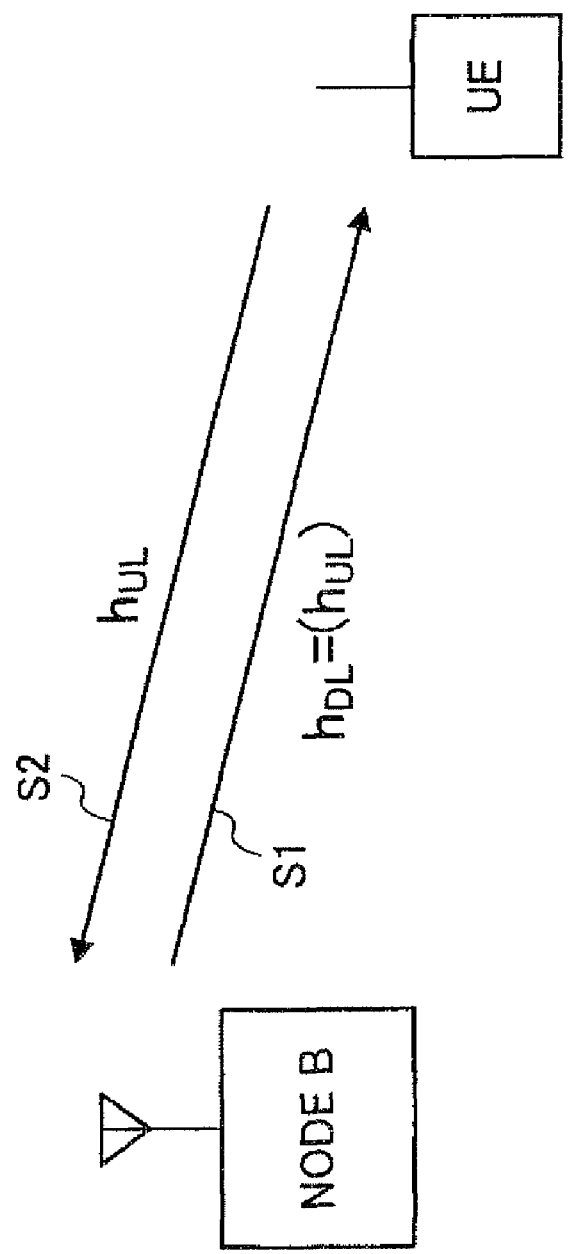
FIG. 2 illustrates an example of a radio communication system.
Figure 3:
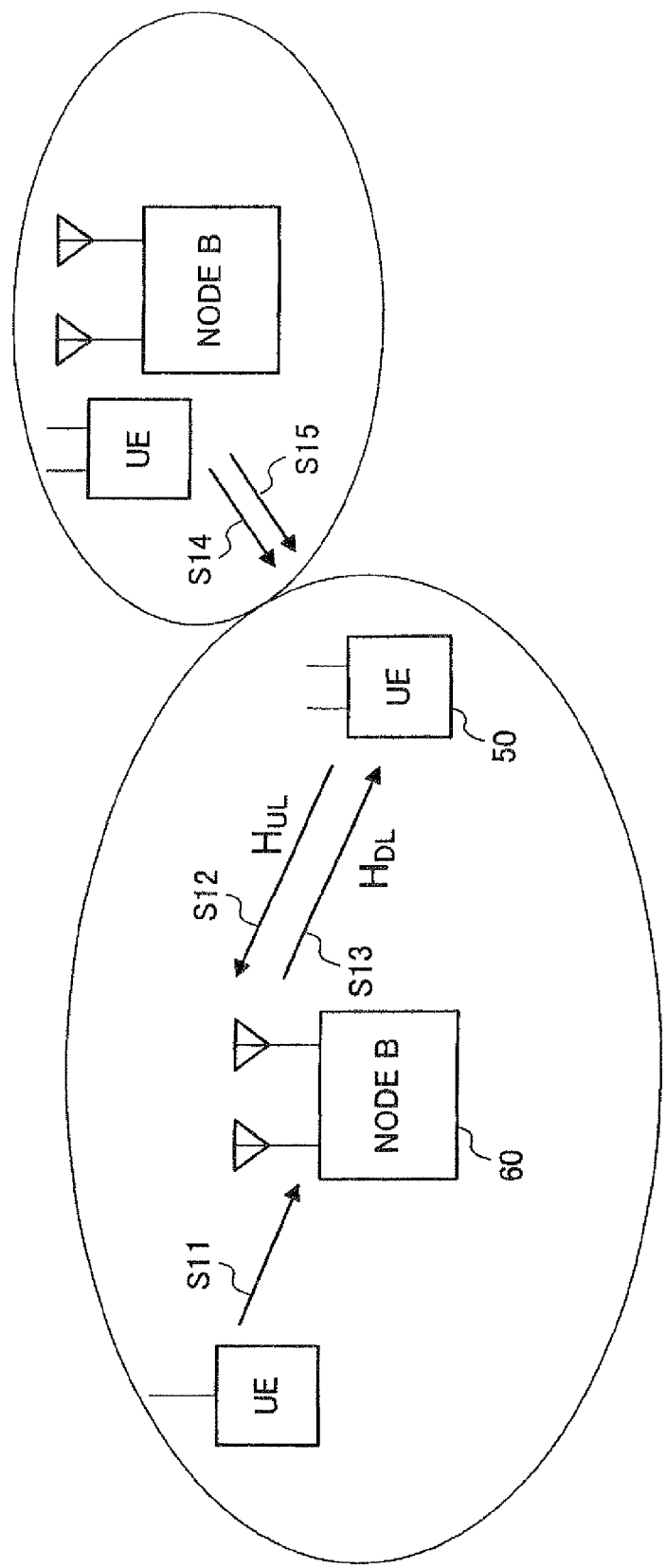
FIG. 3 illustrates a problem in an actual cellular system.
Figure 4:
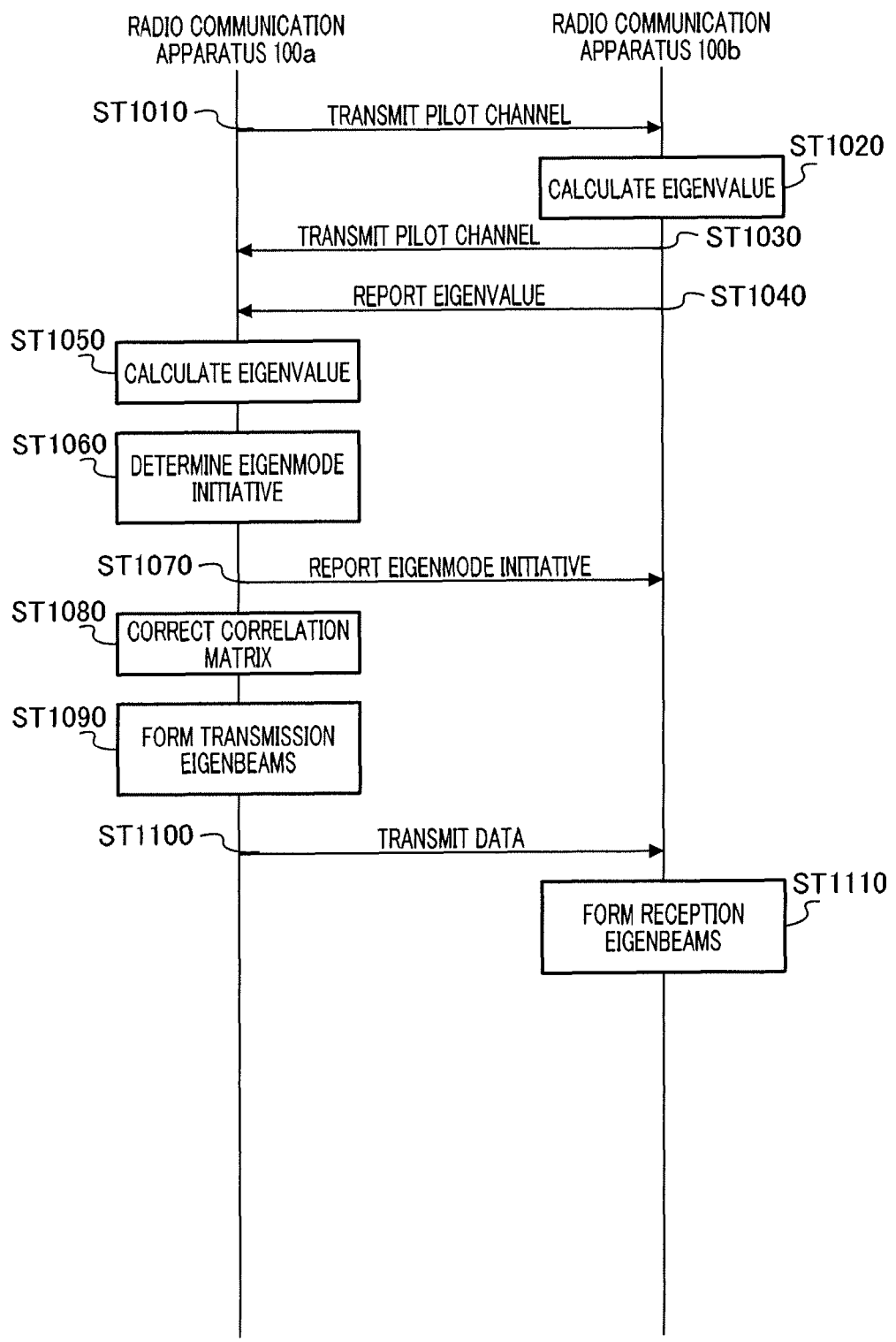
FIG. 4 illustrates a sequence diagram showing the steps of a channel correlation matrix determination method according to Embodiment 1 of the present invention.

FIG. 4 is a sequence diagram showing the steps of a channel correlation matrix determination method in the radio communication system according to Embodiment 1 of the present invention. A case will be explained as an example where the radio communication system has radio communication apparatus 100a and radio communication apparatus 100b.

In the radio communication system of the present embodiment, first, radio communication apparatus 100a transmits the pilot channel using a forward link (ST 1010).

Radio communication apparatus 100b calculates eigenvalues of the channel correlation matrix (simply referred to as a "channel matrix" or a "correlation matrix") based on the received pilot channel (ST 1020), and then transmits the pilot channel and reports a calculated eigenvalue to radio communication apparatus 100a using the reverse link (ST 1030 and ST 1040). Here, the reported eigenvalue is the maximum eigenvalue out of multiple eigenvalues.

Radio communication apparatus 100a receives the pilot channel transmitted through the reverse link and calculates reverse link eigenvalues (ST 1050). By comparing the maximum eigenvalue out of the calculated eigenvalues and the independently reported maximum eigenvalue of radio communication apparatus 100b, radio communication apparatus 100a determines which one of radio communication apparatus 100a and radio communication apparatus 100b has the initiative in forming eigenbeams, that is, radio communication apparatus 100a determines to which one of radio communication apparatus 100a and radio communication apparatus 100b the eigenmode initiative belongs (ST 1060). That is, the forward link maximum eigenvalue and the reverse link maximum eigenvalue are compared, and then the eigenmode initiative is given to the radio communication apparatus of the link of the higher eigenvalue. In this case, assume that the eigenmode initiative is given to radio communication apparatus 100a.

Radio communication 100a reports that radio communication apparatus 100a has the eigenmode initiative, to radio communication apparatus 100b (ST 1070). Next, radio communication apparatus 100a corrects the correlation matrix based on the forward link and reverse link eigenvalues (ST 1080). The correction method will be described later in detail. Radio communication apparatus 100a then forms eigenbeams for transmission using the corrected correlation matrix (ST 1090) and transmits data using these beams (ST 1100).

Radio communication apparatus 100b forms eigenbeams for reception using the correlation matrix acquired by checking the pilot channel (ST 1110) and receives the data using these beams. Here, as the pilot channel for forming the eigenbeams for reception, it is possible to use the pilot channel used in ST 1020 or use the pilot channel attached to data independently transmitted from radio communication apparatus 100a.

As described above, the radio communication system according to the present embodiment acquires the maximum eigenvalue showing the characteristic of the correlation matrix of the received channel for radio communication apparatus 100a and the maximum eigenvalue showing the characteristic of the correlation matrix of the received channel for radio communication apparatus 100b, and corrects the correlation matrix of received channel for radio communication apparatus 100a based on these maximum eigenvalues.

By this means, even if uplink and downlink propagation environments are asymmetrical, it is possible to maintain the symmetry of the uplink and downlink propagation environments by correcting the channel correlation matrix.

Here, if radio communication apparatus 100b has the eigenmode initiative, in ST 1080 or later steps, the processing is switched between radio communication apparatus 100a and radio communication apparatus 100b.

Figure 5:
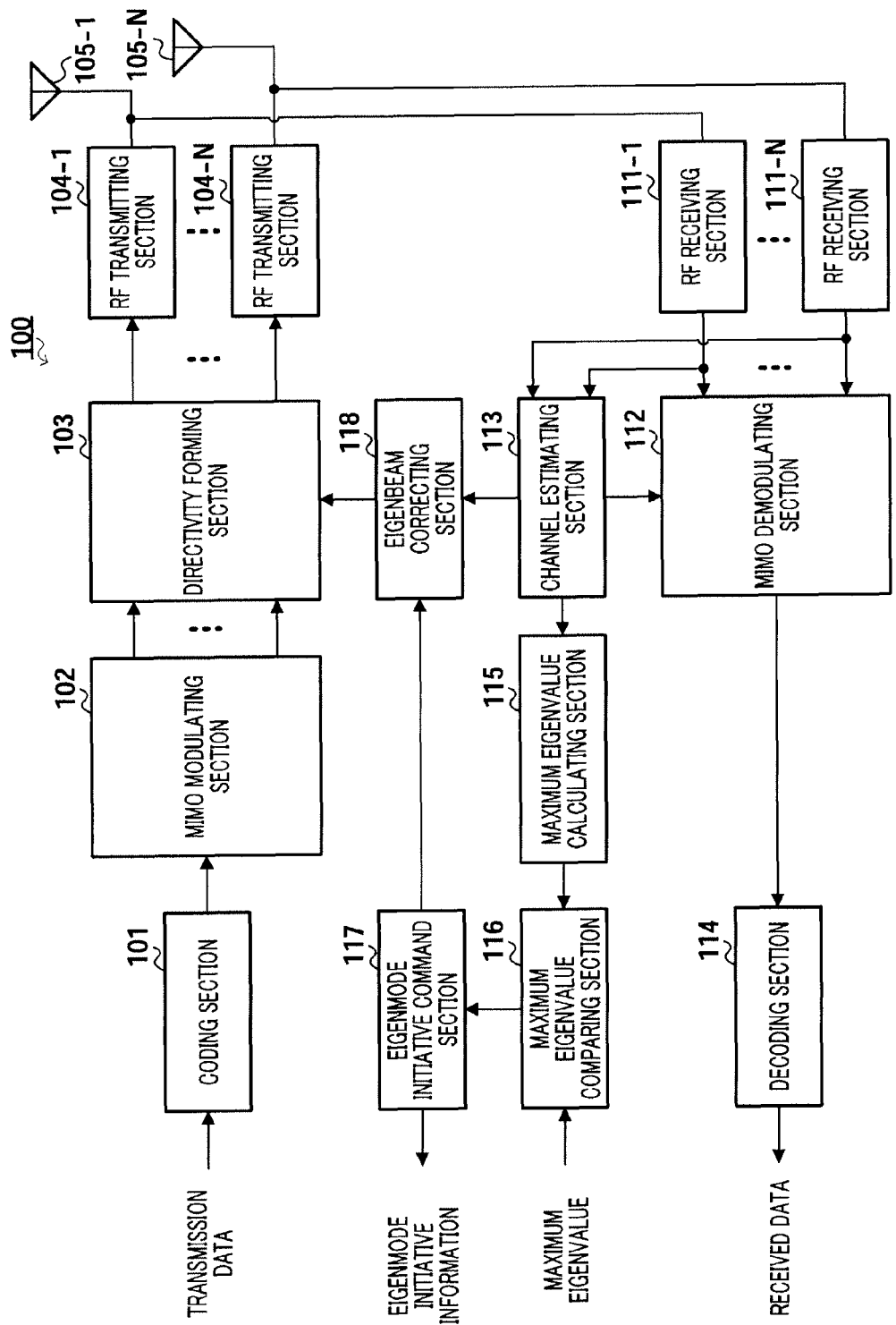
FIG. 5 is a block diagram showing main components of a radio communication apparatus according to Embodiment 1 of the present invention.

FIG. 5 is a block diagram showing the main components of radio communication apparatuses 100a and 100b (generally referred to as "radio communication apparatus 100") that realize the above operations. Here, a case will be explained where radio communication apparatus 100 is a base station apparatus in the mobile communication system, as an example.

Radio communication apparatus 100 is provided with coding section 101, MIMO modulating section 102, directivity forming section 103, RF transmitting sections 104-1 to 104-N, antennas 105-1 to 105-N, RF receiving sections 111-1 to 111-N, MIMO demodulating section 112, channel estimating section 113, decoding section 114, maximum eigenvalue calculating section 115, maximum eigenvalue comparing section 116, eigenmode initiative command section 117 and eigenbeam correcting section 118. Radio communication apparatus 100 is mainly provided with a transmitting system configured with coding section 101 to RF transmitting section 104, and a receiving system configured with RF receiving section 111 to eigenbeam correcting section 118. Here, in this specification, a plurality of components having the same function will be assigned the same reference numerals with different branch numbers for discrimination.

Sections of the radio communication apparatus according to the present embodiment are operated as follows. First, the transmitting system will be explained.

Coding section 101 performs error correcting coding for transmission data using, for example, turbo code and outputs the result to MIMO modulating section 102.

MIMO modulating section 102 performs MIMO modulation for the transmission data transmitted from coding section 101. That is, MIMO modulating section 102 divides the transmission data outputted from coding section 101 into a plurality of streams (in this case, N streams), modulates these streams using a predetermined modulation scheme such as QPSK and 16QAM, and outputs the acquired N modulated signals to directivity forming section 103.

Directivity forming section 103 multiplies weights commanded from eigenbeam correcting section 118 for forming eigenbeams by the modulated signals comprised of N streams outputted from MIMO modulating section 102, and outputs the result to RF transmitting sections 104-1 to 104-N.

RF transmitting sections 104-1 to 104-N performs predetermined transmission processing such as D/A conversion and up-conversion on the N streams, and transmits the acquired radio signals via antennas 105-1 to 105-N.

Next, the receiving system of the radio communication apparatus according to the present embodiment will be explained below.

RF receiving sections 111-1 to 111-N performs predetermined receiving processing such as down-conversion and A/D conversion on the radio signals received via antennas 105-1 to 105-N, and outputs the acquired signals to MIMO demodulating section 112 and channel estimating section 113.

Channel estimating section 113 performs channel estimations for the plurality of received streams outputted from RF receiving sections 111-1 to 111-N based on the pilot channel, generates a channel correlation matrix using the channel estimation values of these streams and outputs this channel correlation matrix to MIMO demodulating section 112 and maximum eigenvalue calculating section 115.

MIMO demodulating section 112 performs MIMO demodulation for the plurality of streams outputted from RF receiving section 111-1 to 111-N. That is, MIMO demodulating section 112 performs channel fluctuation correction for the plurality of streams outputted from RF receiving sections 111-1 to 111-N based on the channel correlation matrix outputted from channel estimating section 113, and then performs demodulation processing supporting a predetermined demodulation scheme such as QPSK and 16QAM for these streams. MIMO demodulating section 112 synthesizes the plurality of streams for acquired demodulated signals into a single stream and outputs a synthesized signal to decoding section 114.

Decoding section 114 performs decoding processing, supporting the error correcting coding used on the transmission side, for the synthesized signal outputted from MIMO demodulating section 112 and acquires received data.

Maximum eigenvalue calculating section 115 calculates the maximum eigenvalue from the channel matrix acquired in channel estimating section 113 and outputs the maximum eigenvalue to maximum eigenvalue comparing section 116.

Maximum eigenvalue comparing section 116 compares the maximum eigenvalue calculated in maximum eigenvalue calculating section 115 and the maximum downlink eigenvalue independently reported from the communication terminal, and outputs this comparison result to eigenmode initiative command section 117.

Eigenmode initiative command section 117 determines whether to give the eigenmode initiative to the base station or to the communication terminal based on the comparison result received from maximum eigenvalue comparing section 116, and, when the initiative is given to the communication terminal, reports the result to the communication terminal via a transmitting section (not shown). Further, when the initiative is given to the base station, eigenmode initiative command section 117 reports this fact to eigenbeam correcting section 118.

When the base station acquires the eigenmode initiative according to the result determined in eigenmode initiative command section 117, eigenbeam correcting section 118 corrects the correlation matrix using the uplink and downlink eigenvalues and commands the weights forming eigenbeams to directivity forming section 103 based on the corrected correlation matrix.

Next, the channel correlation matrix determination method according to the present embodiment performed in above maximum eigenvalue calculating sections 115 to eigenbeam correcting section 118, will be explained in detail.

In particular, a case will be explained where the link on which radio communication apparatus 100 transmits signals to the other radio communication apparatus refers to downlink (DL), the maximum downlink eigenvalue refers to $\lambda_{max,DL}$, the maximum eigenvalue of uplink which is the opposite link to downlink refers to $\lambda_{max,UL}$, and $\lambda_{max,UL}$ is greater than $\lambda_{max,DL}$.

In this case, radio communication apparatus 100 has the eigenmode initiative. Here, assume the environment of the system where significant interference is measured in the downlink receiving terminal, that is, significant interference is measured in the other communication apparatus which is a communicating party, and little interference is measured in the uplink receiving terminal, that is, little interference is measured in radio communication apparatus 100. In such situation, an uplink channel matrix can be acquired in a state with little interference and low error. However, if this channel matrix is directly adopted, when significant interference occurs on downlink, this problem cannot be solved. That is, eigenbeams in these conditions are not optimal. Therefore, focusing this point, the present embodiment performs processing of correcting the channel matrix acquired on uplink by the amount of interference anticipated on downlink.

The value of the eigenvalue acquired from the channel matrix is proportional to received quality such as SINR, and, consequently, reflects the magnitude of interference. Therefore, by using the ratio of uplink and downlink eigenvalues, it is possible to calculate the relative value of the amount of interference. To be more specific, when the transmission correlation matrix is acquired using the uplink channel estimation value, the amount of interference is corrected using a unit matrix, according to following equations 6 and 7.

[2]

$$\alpha = 1 - \frac{\lambda_{max,DL}}{\lambda_{max,UL}}$$ (Equation 6)

$$\tilde{E}_{t,H_{UL}} = \hat{E}_{t,H_{UL}} + \lambda_{max,DL} \cdot \alpha I$$ (Equation 7)

where:
$\hat{E}_{t,H_{UL}}$: transmission correlation matrix
I: unit matrix
$\tilde{E}_{t,H_{UL}}$: corrected correlation matrix In equation 7, the second item of the right-hand side is a correction matrix generated using the maximum downlink eigenvalue. By adding this correction matrix to the uplink channel matrix, the channel matrix is corrected. That is, a case is assumed in equation 7 where the downlink channel matrix is used as a reference and the uplink channel matrix is corrected with reference to the downlink channel matrix. Radio communication apparatus 100 forms eigenbeams for transmission using the corrected correlation matrix acquired through the above steps.

By the way, in the above steps, the other radio communication apparatus which is a communicating party of radio communication apparatus 100 receives the report that the radio communication apparatus does not have the eigenmode initiative, and, consequently, generates a channel matrix based on the signal received in the radio communication apparatus, forms reception eigenbeams using this channel matrix and receives the signal from radio communication apparatus 100.

Thus, the radio communication apparatus according to the present embodiment, in which a first channel correlation matrix shows a property of a link from another radio communication apparatus and a second channel correlation matrix shows a property of a link to another radio communication apparatus, employs a configuration having: a calculating section that calculates a maximum eigenvalue in the first channel correlation matrix; an acquiring section that acquires a maximum eigenvalue in the second channel correlation matrix from another radio communication apparatus; and a correcting section that, when the maximum eigenvalue in the first channel correlation matrix is greater than the maximum eigenvalue in the second channel correlation matrix, corrects the first channel correlation matrix with reference to the second channel correlation matrix.

By this means, even if uplink and downlink propagation environments are asymmetrical, the symmetry of uplink and downlink propagation environments is realized by correcting the channel correlation matrix, so that it is possible to improve eigenmode transmission performance and the throughput of the radio communication system.

Further, according to the present embodiment, a channel correlation matrix is corrected using the maximum eigenvalue which is assumed to be the most reliable one out of multiple eigenvalues.

Further, according to the present embodiment, the maximum eigenvalue is shared between the transmitting side and the receiving side, and a channel correlation matrix is corrected based on this common reference.

Further, although a configuration example has been described with the present embodiment where the maximum eigenvalue is used in the channel correlation matrix determination method, it is also possible to use the minimum eigenvalue instead of the maximum eigenvalue or use the sum or average value of all eigenvalues.

Further, although a configuration example has been described with the present embodiment where the channel correlation matrix of the link having poor received quality is used as a reference and the channel correlation matrix of the other link is corrected with reference to the channel correlation matrix of the link having poor received quality, by contrast, the channel correlation matrix of the link having good received quality can be used as a reference.

Further, although a configuration example has been described with the present embodiment where the channel correlation matrix of either one link is used as the channel correlation matrix for the correction reference and the channel correlation matrix of the other link is corrected using this reference, for example, a matrix having average characteristics of two-way channel correlation matrixes can be used as a reference and correct the channel correlation matrixes of these links based on this reference matrix.

Further, although a case example has been described with the present embodiment where a corrected channel correlation matrix is used for forming eigenbeams, it is also possible to use the channel correlation matrix for other purposes.

Further, although a case example has been described with the present embodiment where the transmitting system configured with coding section 101 to RF transmitting section 104 and the receiving system configured with RF receiving section 111 to eigenbeam correcting section 118 are mounted on an apparatus, these systems do not always need to be mounted on the same apparatus. For example, the transmitting system and the receiving system are separately mounted on different apparatuses.

Embodiment 2

Figure 6:
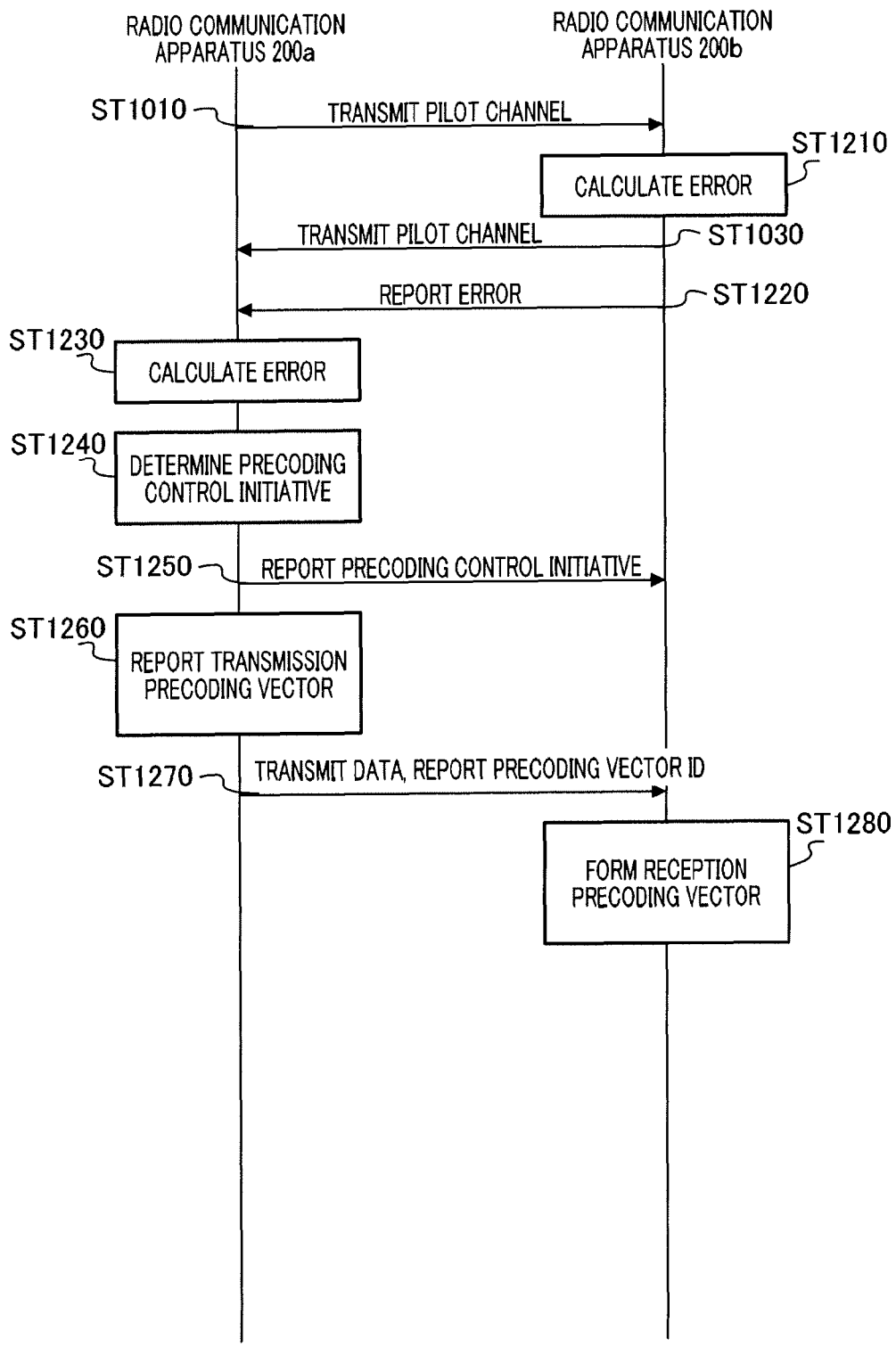
FIG. 6 is a sequence diagram showing the steps of a precoding control method according to Embodiment 2 of the present invention.

FIG. 6 is a sequence diagram showing the steps of preceding control method in the radio communication system according to Embodiment 2 of the present invention. Here, in FIG. 6, the same components as in FIG. 4 will be assigned the same reference numerals and repeated explanations will be omitted.

Radio communication apparatus 200b calculates the minimum error between the maximum eigenvector in a channel correlation matrix and preceding vectors based on the received pilot channel (ST 1210), and reports the calculated error to radio communication apparatus 200a (ST 1220).

Radio communication apparatus 200a calculates the minimum error between preceding vectors and the maximum eigenvector on the reverse link based on the pilot channel transmitted through the reverse link (ST 1230). Further, by comparing the calculated error to the error independently reported from radio communication apparatus 200b, radio communication apparatus 200a determines which one of radio communication apparatus 200a and radio communication apparatus 200b has the initiative in precoding control, that is, radio communication apparatus 200a determines to which one of radio communication apparatus 200a and radio communication apparatus 200b the preceding control initiative belongs (ST 1240). Here, assume that radio communication apparatus 200a has the lower error and is given the preceding control initiative.

Radio communication apparatus 200a reports that radio communication apparatus 200a has the precoding control initiative, to radio communication apparatus 200b (ST 1250). Radio communication apparatus 200a then forms a preceding vector (ST 1260), and transmits data using this preceding vector (ST 1270). At the same time, radio communication apparatus 200a reports the ID of the used preceding vector as a control signal.

Radio communication apparatus 200b forms a precoding vector matching the ID of the preceding vector acquired as a control signal (ST 1280) and receives the data using the preceding vector.

Thus, the radio communication system according to the present embodiment determines in which one of radio communication apparatus 200a and radio communication apparatus 200b the preceding control initiative lies, based on the error showing the characteristic of the link acquired by adopting a preceding vector to the received channel correlation matrix of radio communication apparatus 200a, and on the error showing the characteristic of the link acquired by adopting a percoding vector to the received channel correlation matrix of radio communication apparatus 200b.

By this means, even if uplink and downlink propagation environments are asymmetrical, it is possible to implement preceding control more reliably.

Here, if radio communication apparatus 200b has the preceding control initiative, ST 1260 or later steps are opposite between radio communication apparatus 200a and radio communication apparatus 200b. To be more specific, radio communication apparatus 200a transmits data according to the precoding vector ID designated as a control signal in radio communication apparatus 200b.

Further, although a case has been described above where the maximum eigenvector is used, it is also possible to use error between a plurality of high eigenvectors and associated precoding vectors depending on the quality of these eigenvectors. Further, it is also possible to use a value to be reported as the SINR difference between the first eigenvector and the second eigenvector.

Figure 7:
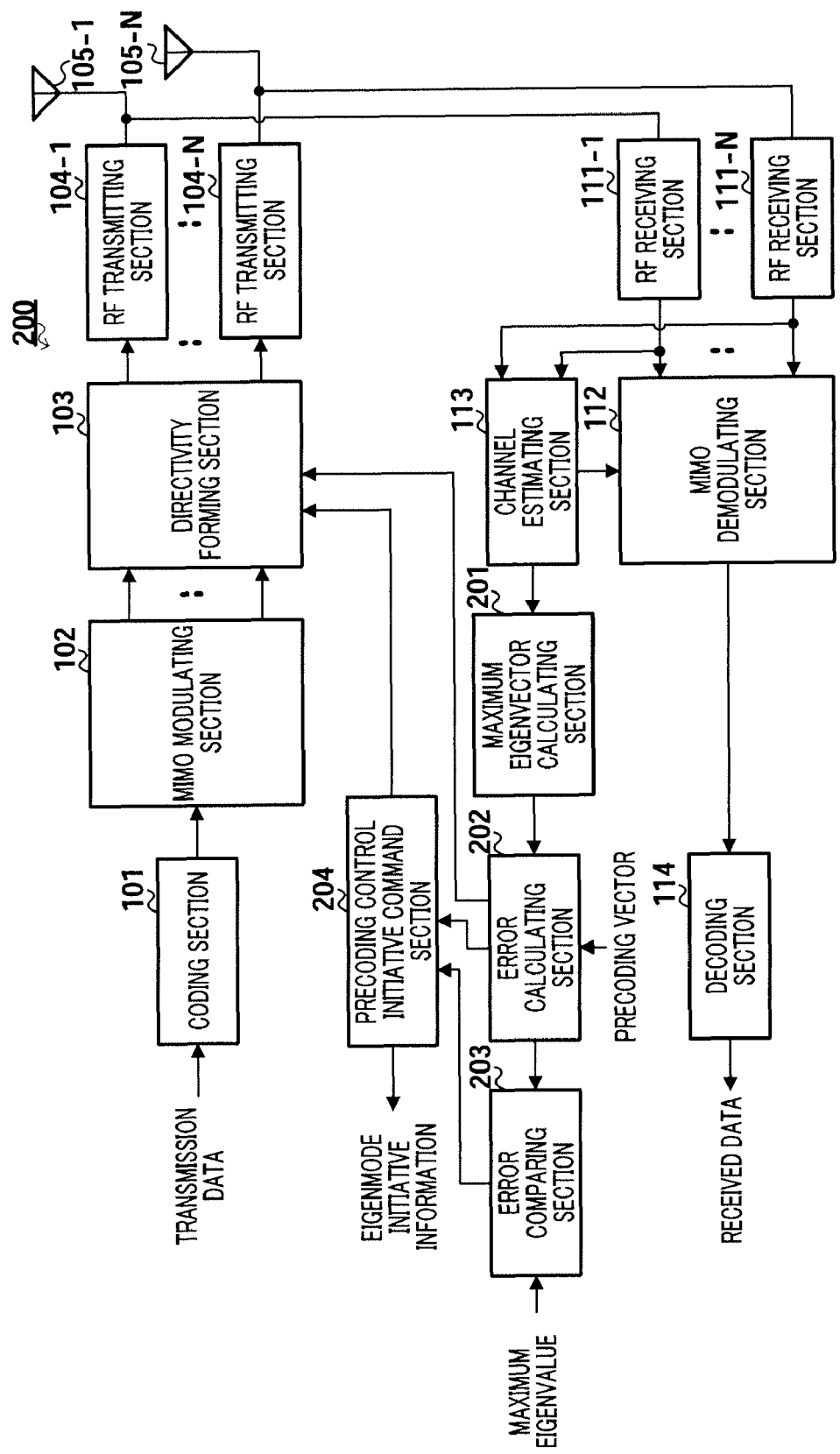
FIG. 7 is a block diagram showing main components of a radio communication apparatus according to Embodiment 2 of the present invention.

FIG. 7 is a block diagram showing the main components of radio communications 200a and 200b (called "radio communication apparatus 200") that realize the above operations. Here, in FIG. 7, the same components as in FIG. 5 will be assigned the same reference numerals and repeated explanations will be omitted.

Maximum eigenvector calculating section 201 calculates the maximum eigenvector using the channel correlation matrix acquired in channel estimating section 113, and outputs the calculated maximum eigenvector to error calculating section 202.

With reference to a predetermined preceding vector, error calculating section 202 searches for the preceding vector having the minimum error with the maximum eigenvector received from maximum eigenvector calculating section 201, and outputs the minimum error value to error comparing section 203 and the preceding vector that minimizes the error to directivity forming section 103.

Error comparing section 203 compares the error calculated in error calculating section 202 to the error of the opposite link independently reported from the communication terminal, and outputs this comparison result to preceding control initiative command section 204.

Precoding control initiative command section 204 determines whether to give the preceding control initiative to the base station or the communication terminal based on the received comparison result from error comparing section 203, and, for example, when the communication terminal has the lower error and acquires the initiative, preceding control initiative command section 204 reports this to the communication terminal via a transmitting section (not shown). Here, when the initiative is given to the base station, this fact is reported to directivity forming section 103.

Thus, the radio communication apparatus according to the present embodiment, in which the error between an eigenvector in the first channel correlation matrix and a preceding vector shows a property of a link from another radio communication apparatus and an eigenvector in the second channel correlation matrix and a preceding vector shows a property of a link to another radio communication apparatus, employs a configuration having: a calculating section that calculates an eigenvector in the first channel correlation matrix; an error calculating section that calculates the first error between the eigenvalue in the first channel correlation matrix and the preceding vector; an acquiring section that acquires the second error between the eigenvector in the second channel correlation matrix and the preceding vector from another radio communication apparatus; and a determining section that determines, based on the first error and the second error, to which one of the radio communication apparatus and another radio communication apparatus the preceding control initiative belongs. By this means, even if uplink and downlink propagation environments are asymmetrical, it is possible to implement precoding control more reliably, thereby improving the throughput of the radio communication system.

Embodiment 3

Figure 8:
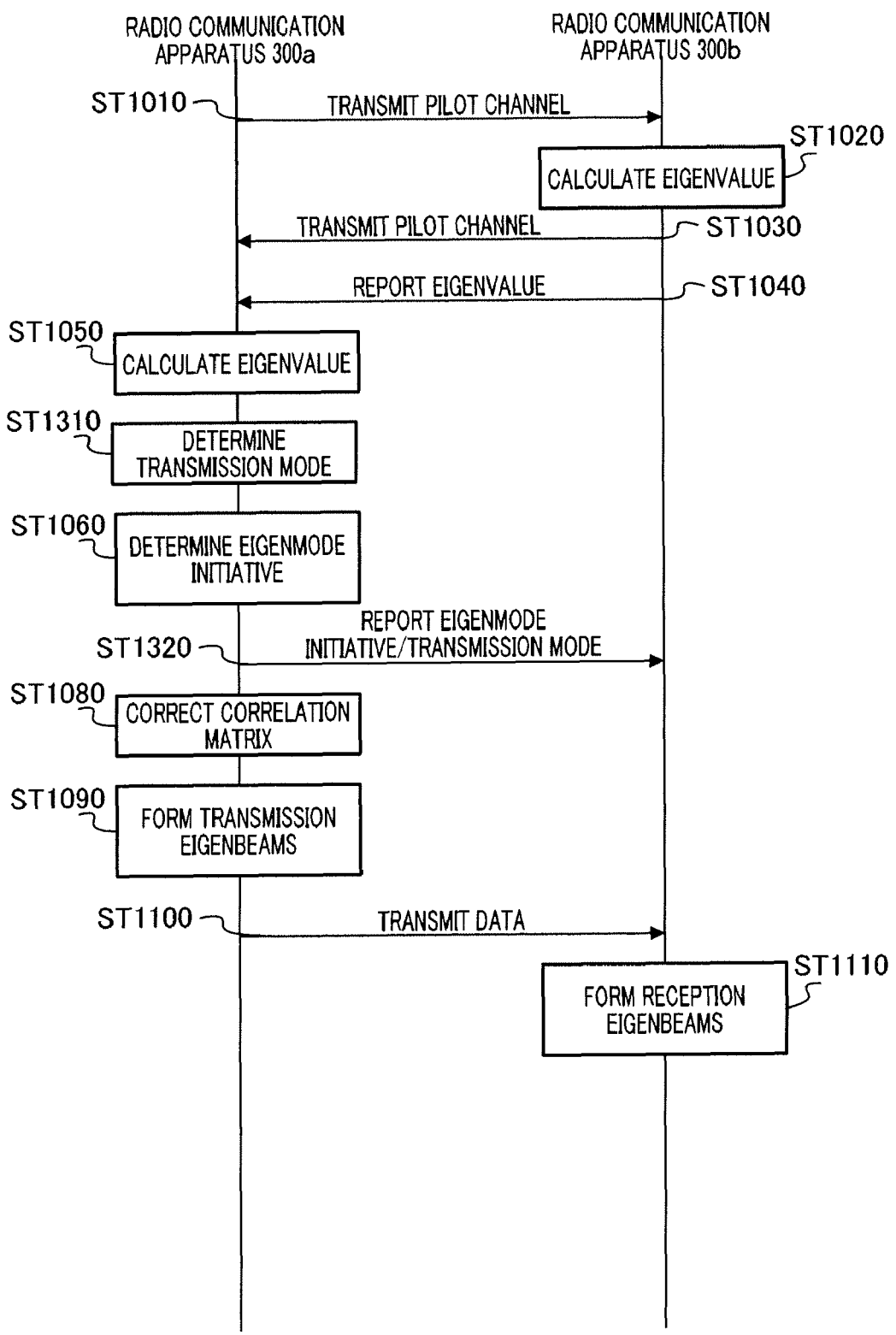
FIG. 8 is a sequence diagram showing the steps of a channel correlation matrix determination method according to Embodiment 3 of the present invention.

FIG. 8 is a sequence diagram showing a channel correlation matrix determination method in the radio communication system according to Embodiment 3 of the present invention. Here, in FIG. 8, the same components as in FIG. 4 will be assigned the same reference numerals and repeated explanations will be omitted.

Radio communication apparatus 300a receives the pilot channel transmitted using the opposite link and calculates the maximum eigenvalue of the opposite link (ST 1050). Radio communication apparatus 300a refers to the calculated maximum eigenvalue and the maximum eigenvalue independently reported from radio communication apparatus 300b, and, when either of these values is less than a predetermined threshold, switches the transmission mode to transmission diversity (ST 1310). Here, assume that the eigenmode initiative is given to radio communication apparatus 300a.

Radio communication apparatus 300a reports that radio communication apparatus 300a has the eigenmode initiative and whether the mode is switched or is not switched, to radio communication apparatus 300b (ST 1320). To be more specific, radio communication apparatus 300a commands whether to select the number of spatial multiplexing (spatial multiplexing) set at first or transmission diversity, according to the above decision.

Thus, in the radio communication system according to the present embodiment, a maximum eigenvalue showing the characteristic of the received channel correlation matrix of radio communication apparatus 300a is acquired, a maximum eigenvalue showing the characteristic of the received channel correlation matrix of radio communication apparatus 300b is acquired, and a transmission mode is switched based on the lower maximum eigenvalue between these maximum eigenvalues. By this means, even if uplink and downlink propagation environments are asymmetrical, it is possible to prevent quality deterioration due to spatial multiplexing on either link, thereby improving the throughput of the radio communication system.

Figure 9:
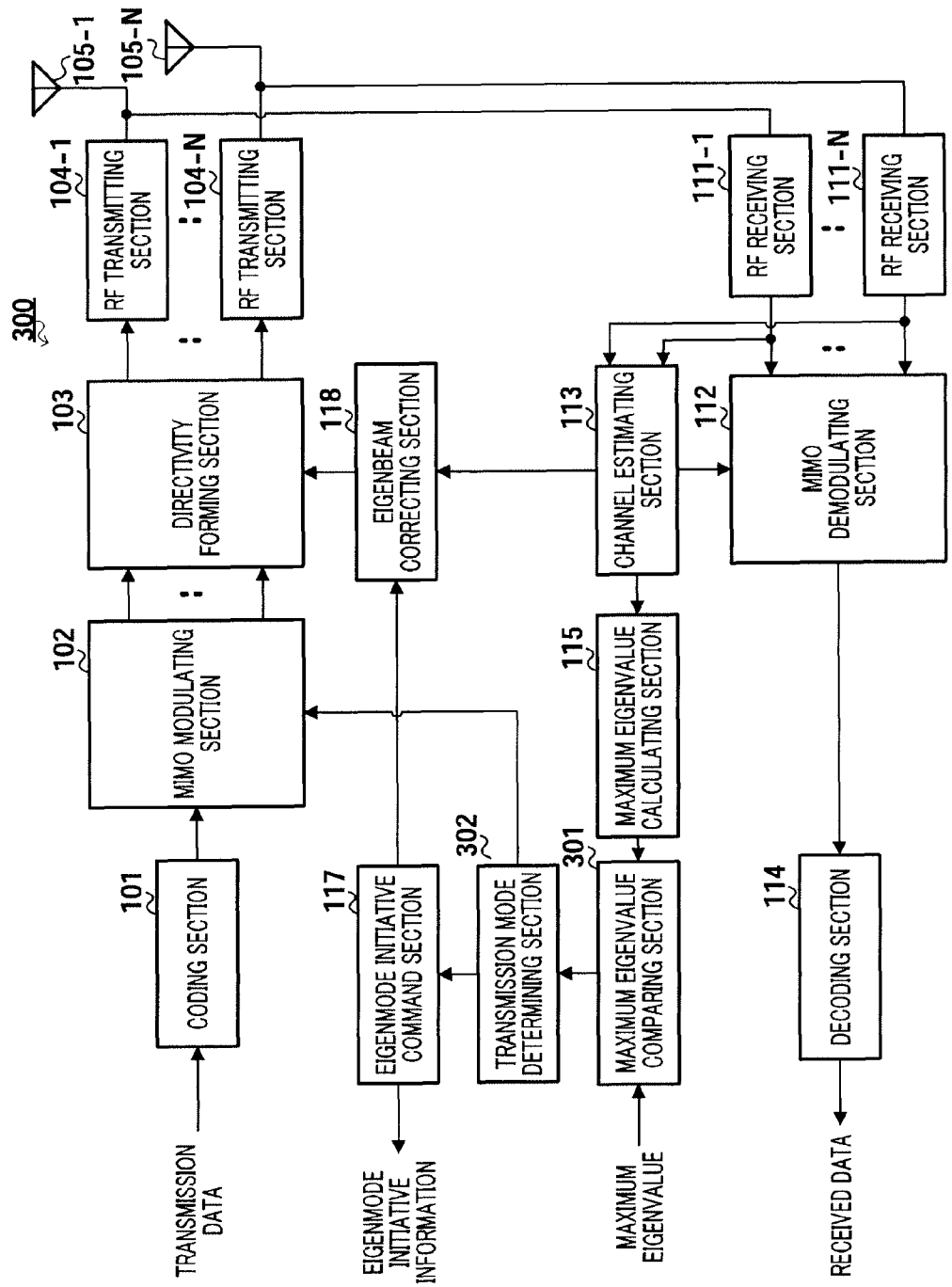
FIG. 9 is a block diagram showing main components of a radio communication apparatus according to Embodiment 3 of the present invention.

FIG. 9 is a block diagram showing the main components of radio communication apparatuses 300a and 300b (called "radio communication apparatus 300") that realize the above operations. Here, in FIG. 9, the same components as in FIG. 5 will be assigned the same reference numerals and repeated explanations will be omitted.

Maximum eigenvalue comparing section 301 compares the maximum eigenvalue calculated in maximum eigenvalue calculating section 115 to the maximum downlink eigenvalue independently reported from the communication terminal, outputs this comparison result to eigenmode initiative command section 117 and outputs the lower maximum eigenvalue in this comparison result to transmission mode determining section 302.

When the maximum eigenvalue received from maximum eigenvalue comparing section 301 is less than a predetermined threshold, transmission mode determining section 302 determines transmission diversity as the transmission mode, and, when the maximum eigenvalue received from maximum eigenvalue comparing section 301 is equal to or greater than the predetermined threshold, determines spatial multiplexing as the transmission mode, and outputs the determined transmission mode to eigenmode initiative command section 117 and MIMO modulating section 102.

Thus, the radio communication apparatus according to the present embodiment employs a configuration having a transmission mode determining section that determines a transmission mode based on the lower maximum eigenvalue out of the maximum eigenvalue in the first channel correlation matrix and the maximum eigenvalue in the second correlation matrix eigenvalue. By this means, even if uplink and downlink propagation environments are asymmetrical, it is possible to prevent quality deterioration due to spatial multiplexing on either link, thereby improving the throughput of the radio communication system.

Further, a case has been described with the present embodiment where spatial multiplexing and transmission diversity are used as a transmission mode, the transmission mode may include the number of multiplexing in spatial multiplexing. For example, a threshold decision is performed for a plurality of thresholds and the lower one of the maximum eigenvalue in the first channel correlation matrix and the maximum eigenvalue in the second channel correlation matrix, and the number of spatial multiplexing may be switched based on the threshold decision result.

Embodiments of the present invention have been explained above.

Here, the radio communication system, radio communication apparatus and channel correlation matrix determination method of the present invention are not limited to the above embodiments and can be implemented with various changes.

Further, the radio communication apparatus of the present invention can be mounted on a mobile station (communication terminal apparatus) and base station apparatus in a mobile communication system, so that it is possible to provide a mobile station apparatus, base station apparatus and mobile communication system having the same advantages as above.

Although a case has been described with the above embodiments as an example where the present invention is implemented with hardware, the present invention can be implemented with software. For example, by describing the channel correlation matrix determination method according to the present invention in a programming language, storing this program in a memory and making the information processing section execute this program, it is possible to implement the same function as the radio communication apparatus of the present invention.

Furthermore, each function block employed in the description of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2006-053901, filed on Feb. 28, 2006, and Japanese Patent Application No. 2007-045423, filed on Feb. 26, 2007, including the specifications, drawings and abstracts, are incorporated herein by reference in their entirety.

INDUSTRIAL APPLICABILITY

The radio communication apparatus and channel matrix determination method of the present invention are applicable to use application such as a mobile station and base station in a mobile communication system.

The invention claimed is:

1. A radio communication system comprising:
a first acquiring section that, out of a first channel correlation matrix and a second channel correlation matrix showing properties of two-way channel between two radio communication apparatuses, acquires a first characteristic value showing a characteristic of the first channel correlation matrix;
a second acquiring section that acquires a second characteristic value showing a characteristic of the second channel correlation matrix;
a determining section that, based on the first characteristic value and the second characteristic value, determines a reference channel correlation matrix to be used to correct the first channel correlation matrix and the second channel correlation matrix; and
a correcting section that corrects one or of both the first channel correlation matrix and the second channel correlation matrix based on the reference channel correlation matrix.

2. The radio communication system according to claim 1, wherein:
the first acquiring section acquires a maximum eigenvalue in the first channel correlation matrix as the first characteristic value; and
the second acquiring section acquires a maximum eigenvalue in the second channel correlation matrix as the second characteristic value.

3. The radio communication system according to claim 2, wherein:
the determining section compares the maximum eigenvalue in the first channel correlation matrix and the maximum eigenvalue in the second channel correlation matrix, and determines the channel correlation matrix associated with the lower maximum eigenvalue as the reference channel correlation matrix; and
the correcting section corrects a channel correlation matrix associated with the higher maximum eigenvalue based on the reference channel correlation matrix.

4. A radio communication apparatus in which a first channel correlation matrix shows a property of a link from another radio communication apparatus and a second channel correlation matrix shows a property of a link to the another radio communication apparatus, the radio communication apparatus comprising:
- a calculating section that calculates a maximum eigenvalue in the first channel correlation matrix;
- an acquiring section that acquires a maximum eigenvalue in the second channel correlation matrix from the another radio communication apparatus; and
- a correcting section that, when the maximum eigenvalue in the first channel correlation matrix is greater than the maximum eigenvalue in the second channel correlation matrix, corrects the first channel correlation matrix with reference to the second channel correlation matrix.

5. The radio communication apparatus according to claim 4, wherein the correcting section performs correction with reference to the second channel correlation matrix by generating a correlation matrix based on the maximum eigenvalue in the second channel correlation matrix and correcting the first channel correlation matrix using the correction matrix.

6. The radio communication apparatus according to claim 5, wherein the correcting section performs the correction by generating the correction matrix using a difference between the maximum eigenvalue in the second channel correlation matrix and the maximum eigenvalue in the first channel correction matrix and adding the correction matrix to the first channel correlation matrix.

7. The radio communication apparatus according to claim 4, further comprising a reporting section that reports the correction to be performed to the another radio communication apparatus.

8. The radio communication apparatus according to claim 4, further comprising a forming section that, when the maximum eigenvalue in the first channel correlation matrix is greater than the maximum eigenvalue in the second channel correlation matrix, forms eigenbeams for transmission signals according to the first channel correlation matrix corrected in the correcting section.

9. The radio communication apparatus according to claim 8, wherein, when the maximum eigenvalue in the first channel correlation matrix is lower than the maximum eigenvalue in the second channel correlation matrix, the forming section forms eigenbeams for received signals according to the first channel correlation matrix that is not corrected.

10. The radio communication apparatus according to claim 4, further comprising a transmission mode determining section that determines a transmission mode based on the maximum eigenvalue in the first channel correlation matrix and the maximum eigenvalue in the second channel correlation matrix.

11. The radio communication apparatus according to claim 10, wherein the transmission mode determining section determines multi-input and multi-output multiplexing or transmission diversity as the transmission mode, according to a result of a threshold decision between a predetermined threshold and a lower value one of the maximum eigenvalue in the first channel correlation matrix and the maximum eigenvalue in the second channel correlation matrix.

12. A communication terminal apparatus comprising the radio communication apparatus according to claim 4.

13. A base station apparatus comprising the radio communication apparatus according to claim 4.

14. A channel correlation matrix determination method comprising the steps of:
- out of a first channel correlation matrix and a second channel correlation matrix showing properties of two-way channels between two radio communication apparatuses, acquiring a first characteristic value showing a characteristic of the first channel correlation matrix;
- acquiring a second characteristic value showing the second channel correlation matrix;
- based on the first characteristic value and the second characteristic value, determining a reference channel correlation matrix to be used to correct the first channel correlation matrix and the second channel correlation matrix; and
- correcting one or of both the first channel correlation matrix and the second channel correlation matrix based on the reference channel correlation matrix.

* * * * *